(12) United States Patent
Gomes et al.

(10) Patent No.: US 6,487,652 B1
(45) Date of Patent: Nov. 26, 2002

(54) METHOD AND APPARATUS FOR SPECULATIVELY LOCKING OBJECTS IN AN OBJECT-BASED SYSTEM

(75) Inventors: Benedict A. Gomes, Berkeley; Lars Bak, Palo Alto; David P. Stoutamire, San Juan Bautista, all of CA (US)

(73) Assignee: Sun Microsystems, Inc., Palo Alto, CA (US)

( * ) Notice: Subject to any disclaimer, the term of this patent is extended or adjusted under 35 U.S.C. 154(b) by 0 days.

(21) Appl. No.: 09/409,932

(22) Filed: Sep. 30, 1999

Related U.S. Application Data

(60) Provisional application No. 60/111,400, filed on Dec. 8, 1998.

(51) Int. Cl.[7] .......................... G06F 17/30; G06F 13/00
(52) U.S. Cl. .................................. 712/23; 709/315
(58) Field of Search ......................... 712/23; 709/100, 709/315, 316

(56) References Cited

U.S. PATENT DOCUMENTS

| | | | | |
|---|---|---|---|---|
| 5,692,193 A | * | 11/1997 | Jagannathan et al. | 709/1 |
| 6,026,401 A | * | 2/2000 | Brealey et al. | 707/201 |
| 6,125,439 A | * | 9/2000 | Tremblay et al. | 712/202 |
| 6,374,286 B1 | * | 4/2002 | Gee et al. | 709/1 |
| 6,405,274 B1 | * | 6/2002 | Chan | 707/8 |

\* cited by examiner

*Primary Examiner*—Eric Coleman
(74) *Attorney, Agent, or Firm*—Beyer Weaver & Thomas, LLP

(57) ABSTRACT

Methods and apparatus for speculatively locking an object are disclosed. According to one aspect of the present invention, a method for acquiring use of an object using a current thread includes a determination of whether a first bit included in the object is set to indicate that the object is speculatively owned by a speculative owner thread. When the object is speculatively owned, the speculative owner thread is allowed to use the object without locking the object. The method also includes checking a stored identifier that is associated with the object and identifies the speculative owner thread, as well as determining whether the stored identifier identifies the current thread. When the stored identifier identifies the current thread, the current thread already has use of the object; i.e., the current thread is the speculative owner thread. Finally, the method includes locking the object using the speculative owner thread when it is determined that the stored identifier does not identify the current thread. In one embodiment, as for example when substantially all objects in a computing system are known to be suitable for speculative ownership, the stored identifier is checked before determining when the first bit associated with the object is set to indicate that the object is associated with the speculative owner thread.

28 Claims, 9 Drawing Sheets

METHOD AND APPARATUS FOR SPECULATIVELY LOCKING OBJECTS IN AN OBJECT-BASED SYSTEM

CROSS-REFERENCE TO RELATED APPLICATION

The present application is related to co-pending provisional U.S. patent application No. 60/111,400, filed Dec. 8, 1998, which is incorporated herein by reference in its entirety.

BACKGROUND OF THE INVENTION

1. Field of Invention

The present invention relates generally to methods and apparatus for improving the performance of software applications. More particularly, the present invention relates to methods and apparatus for reducing the overhead associated with allowing a thread to effectively own an object.

2. Description of the Related Art

In object-based computing systems, objects are generally operated on by threads. An object typically includes a set of operations and a state that remembers the effect of the operations. Since an object has some memory capability, an object differs from a function, which has substantially no memory capability. A thread, as will be understood by those skilled in the art, is essentially a single sequential flow of control within a computer program. In general, a thread, or a "thread of control," is a sequence of central processing unit (CPU) instructions or programming language statements that may be independently executed. Each thread has its own execution stack on which method activations reside.

During the execution of an object-based program, multiple threads may attempt to execute operations which involve a single object. Frequently, only one thread is allowed to invoke one of some number of operations, i.e., synchronized operations, that involve a particular object at any given time. That is, only one thread may be allowed to execute a synchronized operation on a particular object at one time. A synchronized operation, e.g., a synchronized method, is block-structured in that it requires that the thread invoking the method to first synchronize with the object that the method is invoked on, and desynchronize with that object when the method returns. Synchronizing a thread with an object generally entails controlling access to the object using a synchronization construct before invoking the method.

Since a thread, e.g., a concurrent thread as will be appreciated by those skilled in the art, is not able to predict when it will be forced to relinquish control, synchronization constructs such as locks, mutexes, semaphores, and monitors may be used to control access to shared resources during periods in which allowing a thread to operate on shared resources would be inappropriate. By way of example, in order to prevent more than one thread from operating on an object at any particular time, objects are often provided with locks. The locks are arranged such that only the thread that has possession of the lock for an object is permitted to execute a method on that object.

With reference to FIG. 2, the steps associated with locking an object will be described. A process 104 of locking an object begins at step 108 in which object information associated with the object is obtained by the thread that is attempting to lock the object, i.e., the current thread. While the object information that is obtained may vary, the object information generally includes bits or pointers which identify whether the object is already locked.

After the object information is obtained, a determination is made in step 112 as to whether the object is locked by another thread, or a thread which is not the current thread. If the determination is that the object is locked by another thread, then process control moves to step 116 in which the current thread blocks itself. By blocking itself, the current thread may effectively put itself to sleep, or otherwise cease execution, until notification is received that the object is no longer locked. When notification that the object is available is received in step 120, then the current thread unblocks itself and obtains the object lock in step 124. By obtaining the object lock, the current thread becomes the owner of the object, and is allowed to operate on the object. Hence, the process of locking the object is completed.

Alternatively, when it is determined in step 112 that the object is not locked by another thread, then a determination is made in step 128 regarding whether the current thread has already locked the object. In other words, the current thread determines whether it holds the lock on the object. If it is determined that the current thread has not already locked the object, then the indication is that the object is not locked. Accordingly, process flow moves to step 136 where a locking record in the object information is updated to indicate that the object is locked, or owned, by the current thread. When there is no existing locking record, then a new locking record is created, and set to indicate that the object is locked by the current thread. Once the locking record is either updated or set, the process of locking the object is completed.

Returning to step 128, if the determination is that the object is already locked by the current thread, then in step 132 the locking record in the object information is updated to indicate the depth of the lock. Indicating the depth of the lock effectively identifies how many separate operations the current thread is either performing or attempting to perform on the object. The indication of the depth of the lock prevents the current thread from releasing the lock prematurely, e.g., before the current thread is finished operating on the object, as will be appreciated by those skilled in the art. After the depth of the lock is updated, the process of locking the object is completed.

In order to prevent a thread from acquiring ownership of an object while another thread is studying the object, e.g., attempting to lock the object, operations associated with locking an object are performed atomically. That is, the sequence of operations associated with locking an object is essentially performed all at once. The use of atomic operations is computationally expensive and, as a result, an object locking process is expensive.

Some objects or data structures, such as vectors and hash tables, are effectively implemented in a single-threaded manner. That is, ownership of such objects or data structures is rarely contested. However, despite the fact that some objects or data structures are substantially always used by the same thread, the objects or data structures still include locks. Therefore, whenever the thread wishes to operate on or use such objects or data structures, a locking procedure is performed. As previously mentioned, a locking procedure includes atomic operations which are computationally costly. The performance of an expensive locking procedure on an object whose ownership will generally not be contested may unnecessarily increase the overhead associated with the execution of an object-based program, since substantially only the owner thread will ever attempt to operate on the object.

Therefore, what is desired is a method for reducing the cost associated with locking an object whose ownership is not typically contested. That is, what is needed is an efficient method for allowing an object to be operated on by a thread when the thread has not actually locked the object.

SUMMARY OF THE INVENTION

The present invention relates to an object which may be speculatively locked such that a thread may operate on the object without acquiring the actual lock associated with the object. Enabling a thread to effectively possess an object without actually owning the object reduces the locking overhead associated with an overall computing system, thereby improving the performance of the computing system. According to one aspect of the present invention, a method for acquiring use of an object using a current thread includes a determination of whether a first bit associated with the object is set to indicate that the object is speculatively owned by a speculative owner thread. When the object is speculatively owned, the speculative owner thread is allowed to use the object without locking the object. The method also includes checking a stored identifier that is associated with the object and identifies the speculative owner thread, as well as determining whether the stored identifier identifies the current thread. When the stored identifier identifies the current thread, the current thread already has use of the object; i.e., the current thread is the speculative owner thread. Finally, the method includes locking the object using the speculative owner thread when it is determined that the stored identifier does not identify the current thread.

In one embodiment, as for example when substantially all objects in a computing system are known to be suitable for speculative ownership, the stored identifier is checked before determining when the first bit associated with the object is set to indicate that the object is associated with the speculative owner thread. In another embodiment, the current thread calls a safepoint during which the object is locked using the speculative owner thread. In such an embodiment, locking the object involves identifying at least one stack frame in the thread stack of the speculative owner thread that has an associated locking record and modifying, or otherwise setting, the locking record to identify the object as being locked by the speculative owner thread.

According to another aspect of the present invention, a computer-implemented method for acquiring ownership of an object in a threaded system includes assigning non-locked ownership, e.g., speculative ownership, of the object to a first thread. Assigning non-locked ownership of the object to the first thread enables the first thread to operate on the object without possessing an ownership lock associated with the object. The method also includes attempting to obtain the ownership lock associated with the object using a second thread. Attempting to obtain the ownership lock associated with the object using the second thread includes causing the first thread to acquire possession of the ownership lock. In one embodiment, assigning non-locked ownership of the object to the first thread includes setting bits, which are separate from bits associated with an ownership lock, in the object to associate the object with the first thread.

In accordance with still another aspect of the present invention, an object-based computing system includes a speculative owner thread, which has an associated stack, and an object. The computing system includes a first determinator that determines when a first bit associated with the object is set to indicate that the object is associated with the speculative owner thread. The speculative owner thread may use the object without locking the speculative owner thread.

The computing system also includes a checking mechanism that checks a stored identifier that is stored in the object and identifies the speculative owner thread. A second determinator in the computing system determines whether the stored identifier identifies the current thread, and a locking mechanism is arranged to lock the object with respect to the speculative owner thread when it is determined that the stored identifier does not identify the first thread.

These and other advantages of the present invention will become apparent upon reading the following detailed descriptions and studying the various figures of the drawings.

BRIEF DESCRIPTION OF THE DRAWINGS

The invention may best be understood by reference to the following description taken in conjunction with the accompanying drawings in which.

DETAILED DESCRIPTION OF THE EMBODIMENTS

Figure 1:
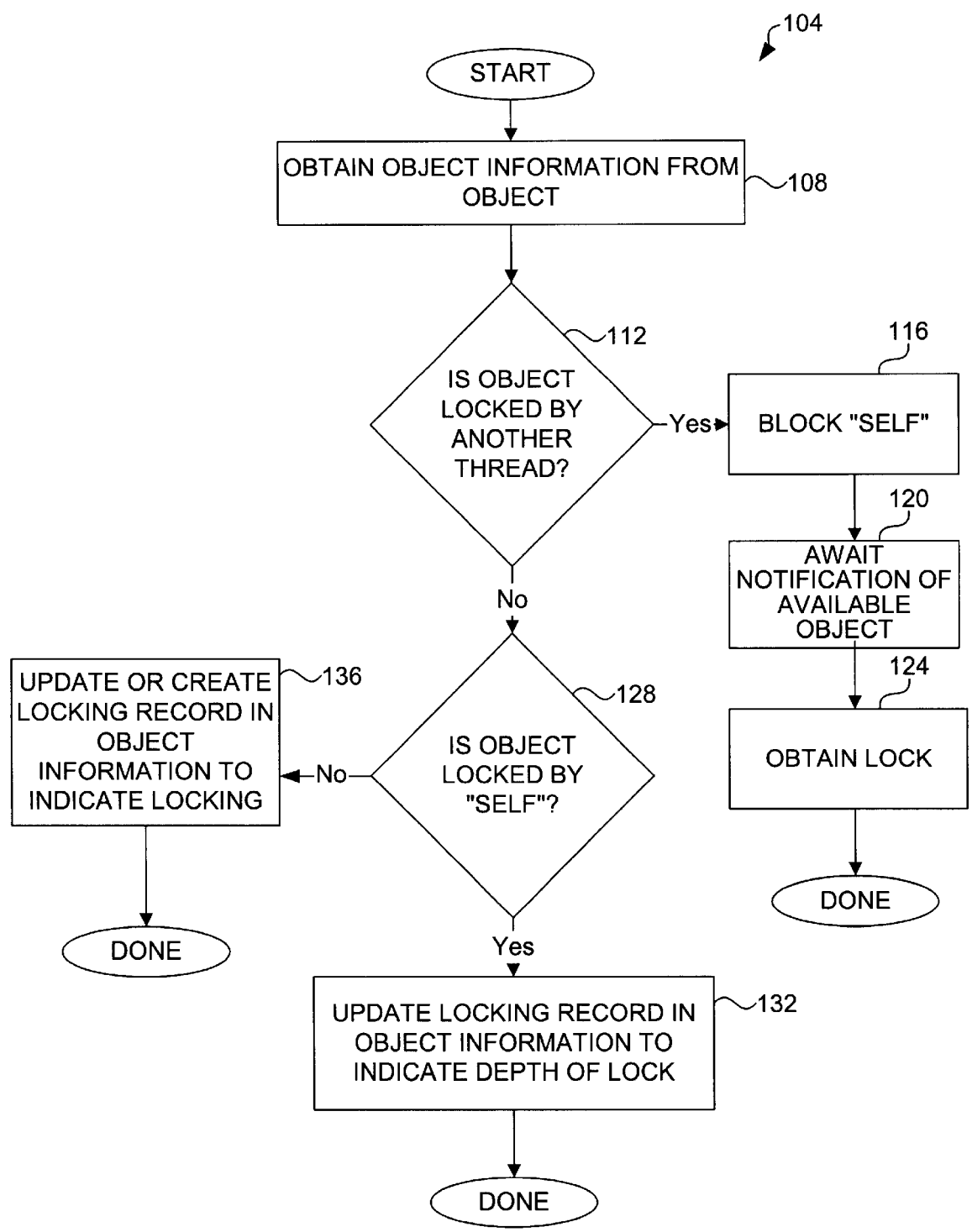
FIG. 1 is a process flow diagram which illustrates the steps associated with locking an object.

In object-based systems, multiple threads may attempt to operate on a given object. Since only one thread may use the given object at any particular time, synchronization constructs are used to prevent more threads from simultaneously possessing the given object. To prevent a thread from acquiring ownership of an object while another thread is attempting to lock the object, a sequence of operations associated with locking an object are performed atomically, or effectively all at once. The performance of a sequence of operations in an atomic manner is computationally expensive, e.g., requires substantial computational overhead.

When an object is highly contended, e.g., when a thread or threads repeatedly attempt to acquire an object, the overhead associated with locking the object is high, since a locking process is executed each time access to the object is granted. In particular, when an object is effectively a single-threaded object, or an object which is typically operated upon by a specific thread, repeatedly locking the object may be considered to be unnecessary, as it is rare that another thread would attempt to lock the object. If an object is typically accessed by one particular thread, allowing that thread to operate on the object without locking the object would reduce the locking overhead associated with operating on the object.

By allowing a given thread to operate on and effectively "possess" an object without actually having to lock the object, the overhead associated with obtaining a lock on the object may be avoided as long as the given thread is substantially the only thread attempting to operate on the object. Specifically, a given thread may "speculatively" lock an object such that it may operate on the object as if it held the object lock. That is, a given thread may essentially associate itself with an object without actually obtaining the object lock.

In one embodiment, while an object is speculatively locked by a given thread, the identity of the given thread is associated with the object. By way of example, the thread identifier (ID) of the given thread may be stored as a word in the object. Each time the given thread attempts to acquire the object, e.g., acquire the lock on the object, the identity of the given thread is verified as being associated with the object, and the given thread is allowed to operate on the object without actually locking the object. When a different, or contending, thread attempts to acquire the lock on the object, it detects that it is not the "owner," i.e., speculative owner, thread. Hence, the object may then be actually locked by the given thread which has speculatively locked he object to prevent the contending. Avoiding locking an object until its ownership is being contended reduces the overall overhead associated with a computing system, thereby improving the performance of the computing system. Specifically, the thread which speculatively owns an object may operate on the object and avoid locking the object until another thread attempts to obtain actual ownership of the object. Although the thread which speculatively own an object will generally check to determine if the object is already actually owned or if the thread speculatively owns the object, such checking processes require significantly less computational overhead than a locking process.

Figure 2:
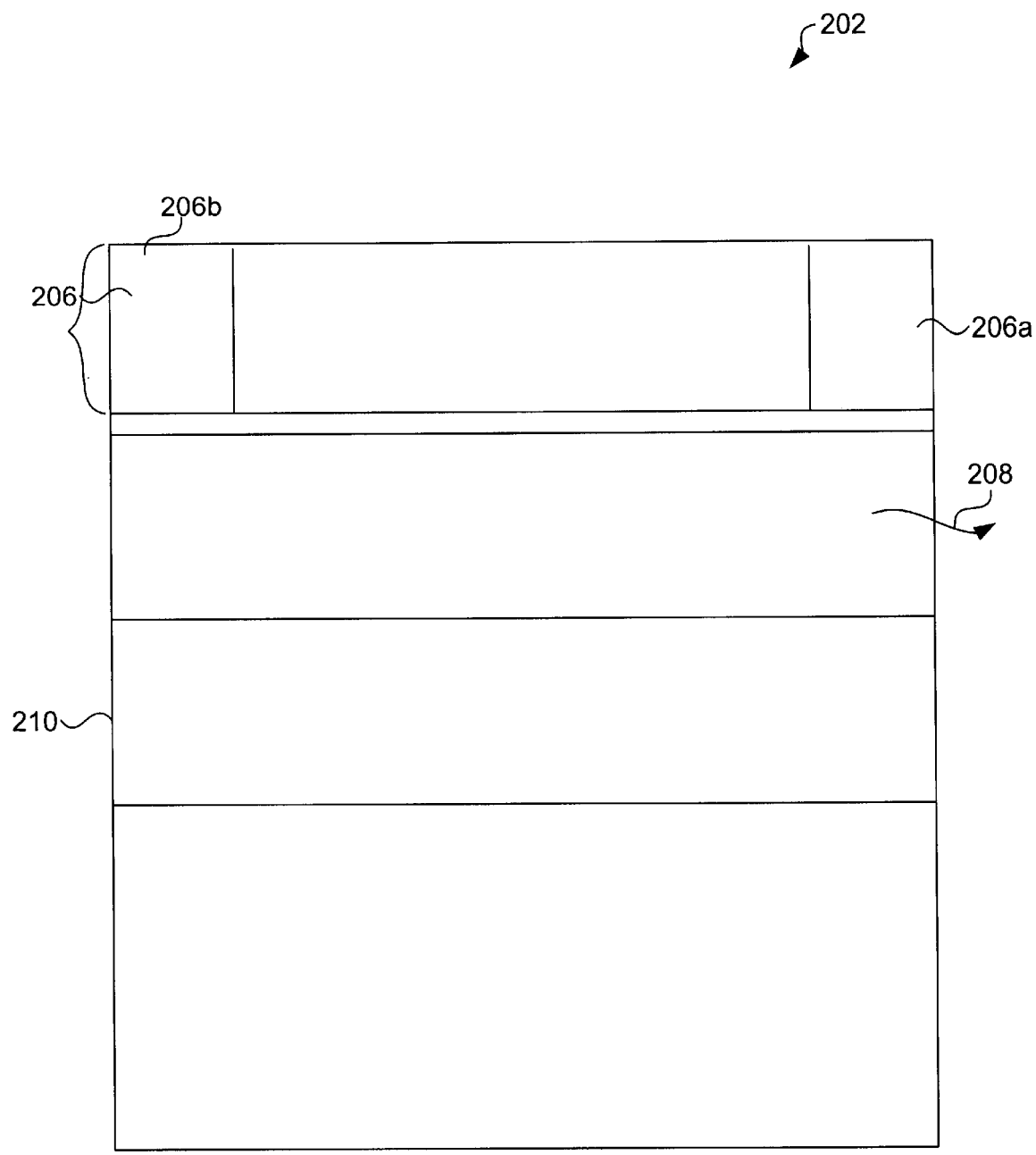
FIG. 2 is a diagrammatic representation of an object in accordance with an embodiment of the present invention.

With reference to FIG. 2, one embodiment of an object which is arranged to be speculatively locked will be described. A representation of an object 202 includes an object header 206. Object header 206 generally includes, but is not limited to, object information such as locking information bits 206a, identity hash values and garbage collection, i.e., memory management, information. In the described embodiment, object header 206 includes a speculative locking bit 206a. Speculative locking bit 206a is arranged to indicate whether object 202 is speculatively locked. By way of example, when speculative locking bit 206a is set to true value, the indication may be that object 202 is currently speculatively owned by a thread such that the thread may operate on object 202 as if the thread owned object 202. Alternatively, when speculative locking bit 206a is set to a false value or is otherwise not set, then the indication may be either that object 202 is not speculatively locked. In other words, object 202 is either not locked at all or is actually locked, e.g., a synchronization construct (not shown) such as a lock associated with object 202 is possessed by a thread. Although speculative locking bit 206a is described as being included in object 202, it should be understood that speculative locking bit 206a may instead be associated with object 202 such that speculative locking bit 206a is stored elsewhere, e.g., in a separate data structure.

Object 202 also includes a pointer 208 to an associated class and a word 210 that is arranged to hold a thread ID. In general, the associated class is the class of which object 202 is an instance. Such a class is generally a class which allows for objects to be speculatively locked. Word 210 is arranged such that when speculative locking bit 206b indicates that object 202 is speculatively locked, word 210 holds or stores the thread ID for the thread which speculatively owns object 202. That is, word 210 is arranged to store an identifier which identifies a speculative owner thread when object 202 is speculatively locked. It should be appreciated that even when object 202 is not speculatively locked, word 210 may hold the thread ID for a thread that is suitable for speculatively locking object 202. While word 210 is described as being included in object 202, in one embodiment, word 210 may instead be located in a data structure or computer memory associated with, but not included within, object 202.

Figure 3:
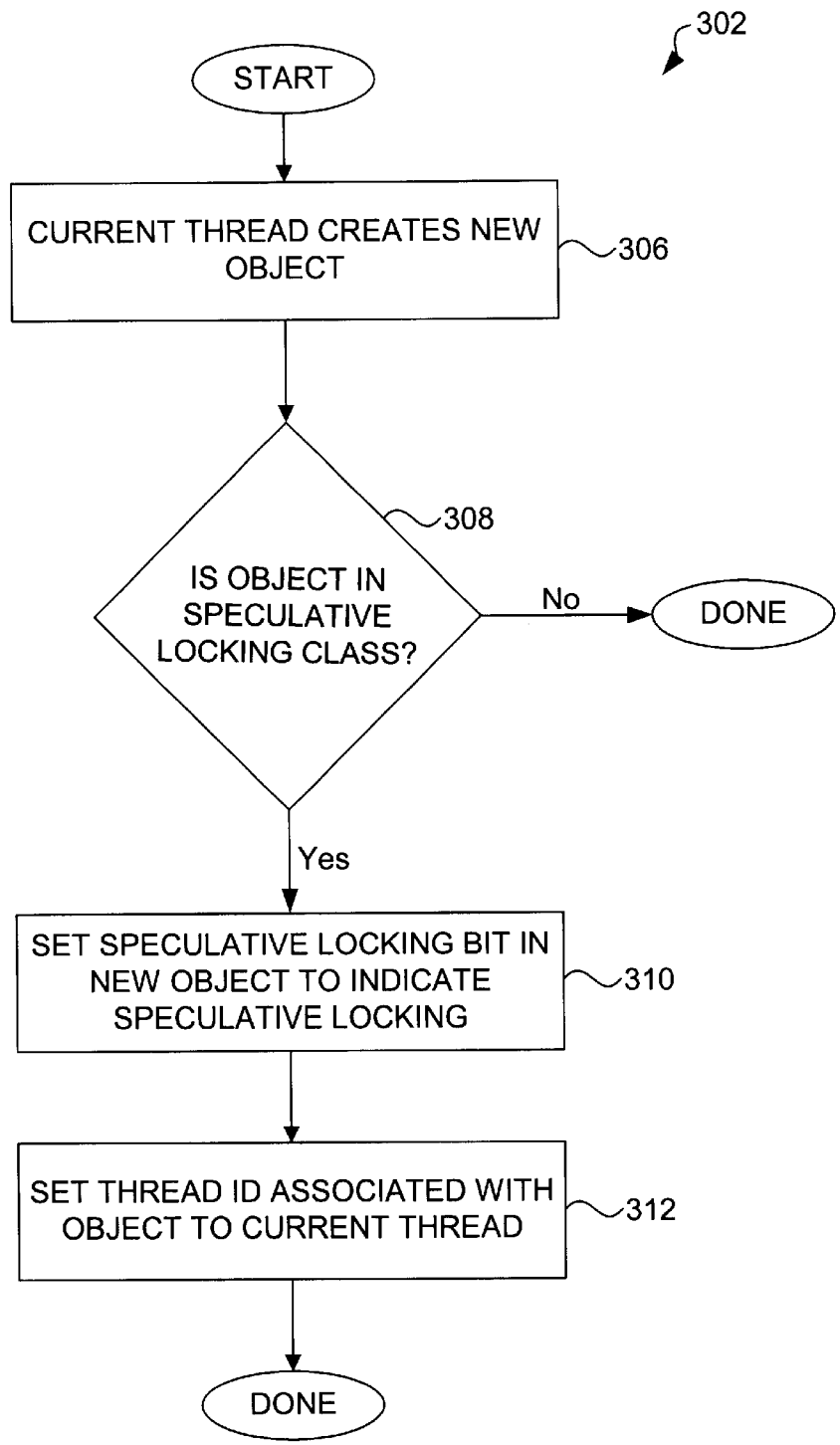
FIG. 3 is a process flow diagram which illustrates a process of initializing an object in accordance with an embodiment of the present invention.

When object 202 is created by a thread, object 202 may be speculatively locked by the thread. In other words, object 202 may be initialized to a speculatively locked state at the time of its creation. FIG. 3 is a process flow diagram which illustrates a process of initializing an object in accordance with an embodiment of the present invention. A process 302 of initializing an object begins at step 306 in which a current thread, e.g., the thread with control of a process, creates a new object. Methods that are used to create, or instantiate, objects are well-known to those skilled in the art.

Once the object is created, a determination is made in step 308 as to whether the object is in a speculative locking class. In other words, it is determined whether the new object is an instance of a class which supports speculative locking. The determination may involve, but is not limited to, identifying whether the object includes or is associated with an extra word for storing a thread ID. If the determination is that the object is not suitable for speculative locking, then the process of creating the object is completed.

Alternatively, if the determination in step 308 is that the object is a member of a speculative locking class, the process flow proceeds to step 310 in which the speculative locking bit in the object is set to indicate that the object is speculatively locked. Setting the speculative locking bit to indicate speculative locking may involve setting the bit to a value of true. After the speculative locking bit is set, the thread ID associated with the object is set to identify the current thread in step 312. Once the thread ID is effectively set to the current thread, the process of creating the new object is completed.

The speculative locking of an object enables the thread which holds the speculative lock to in essence "possess" the object without actually locking the object, i.e., actually owning the object. That is, the thread which holds the speculative lock is allowed to use the object without incurring the overhead associated with actually locking the object. Since an object may be accessed consistently by the same thread, e.g., since an object may be effectively single-thread, reducing the overhead associated with locking or assigning ownership of the object improves the performance of a system which includes the object.

In the described embodiment, before a thread attempts to access or use an object, the thread generally determines or initializes a determination of whether the object is speculatively locked. Even repeatedly making such a determination typically incurs significantly less overhead than would be incurred by locking an object, especially when the object in question is effectively single-threaded, i.e., typically accessed by a particular thread. It should be understood that processes used to determine whether an object is speculatively locked as a part of an attempt to possess the object may vary widely depending upon factors which include, but are not limited to, the characteristics of an overall system. By way of example, the processes may differ depending upon whether all objects in a system are instances of a speculative locking class. A process of attempting to actually lock an object that is known to be an instance of a speculative locking class will be discussed below with respect to FIG. 4, while a process of attempting to actually lock an object which may or may not be an instance of a speculative locking class will be discussed below with respect to FIG. 5.

Figure 4:
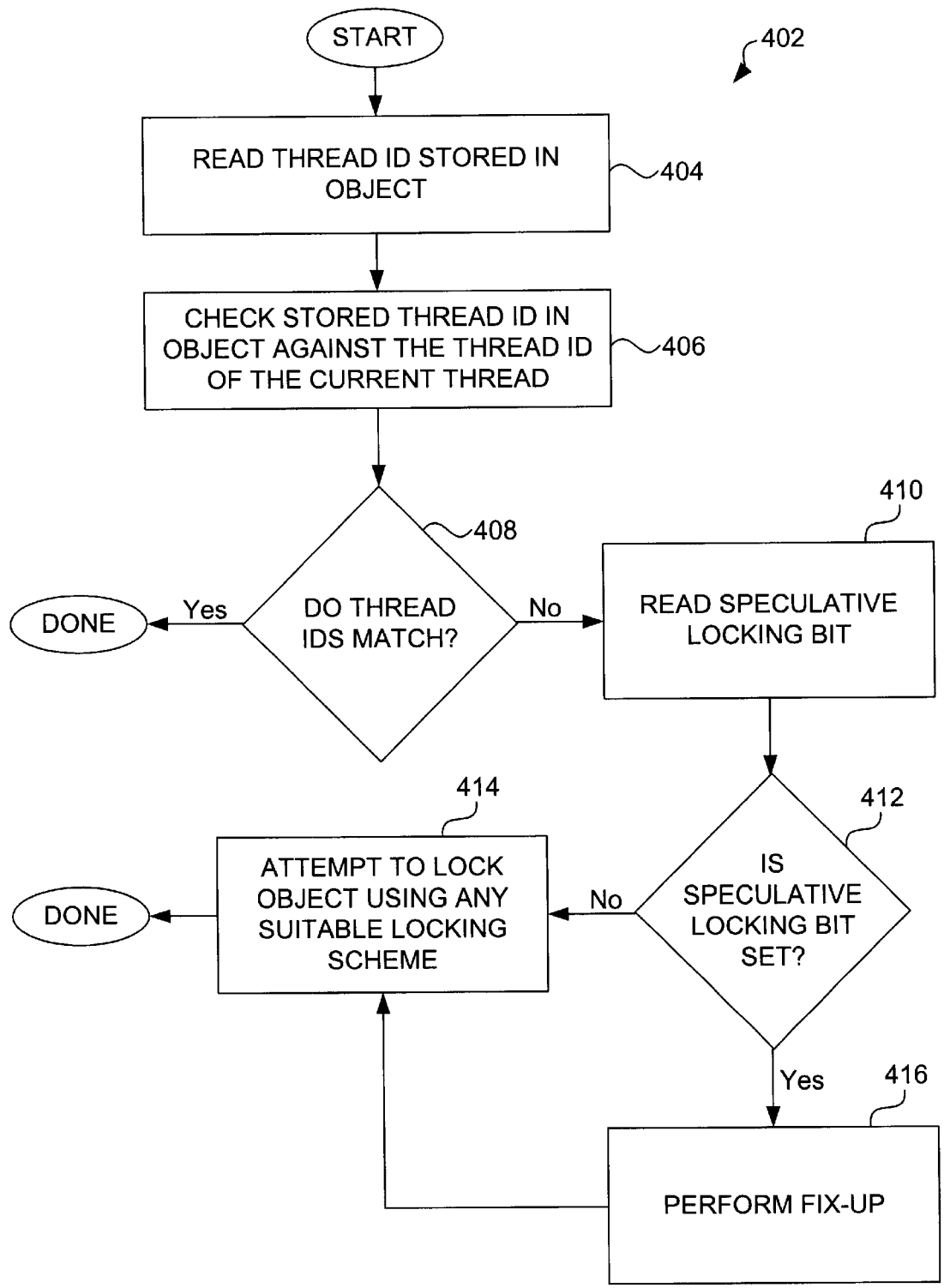
FIG. 4 is a process flow diagram which illustrates a process of locking an object which is known to be suitable for speculative locking in accordance with an embodiment of the present invention.

With reference to FIG. 4, one method of attempting to actually lock an object which is known to be suitable for speculative locking will be described in accordance with an embodiment of the present invention. A process 402 of locking an object begins at step 404 in which the thread ID associated with the object, e.g., stored in the object, is read by a current thread. As discussed above with respect to FIG. 2, the thread ID may be stored as an extra word in an object that is arranged to be speculatively locked.

The stored thread ID is compared against the thread ID of the current thread in step 406 in order to determine whether the stored thread ID and the thread ID of the current thread are substantially identical. A determination is made in step 408 regarding whether the stored thread ID and the thread ID of the current thread match. When the determination is that the stored thread ID and the thread ID of the current thread match, then the indication is that the current thread has speculatively locked the object, and the process of locking the object is terminated. When the current thread has speculatively locked the object, the current thread is allowed to use, e.g., operate on, the object as if it owned the object without actually locking the object.

Alternatively, if it is determined in step 408 that the stored thread ID and the current thread ID do not match, then the implication is that the current thread has riot speculatively locked the object. Hence, the thread is either speculatively locked by another thread or actually locked. Accordingly, process flow proceeds to step 410 in which the speculative locking bit is read from the object, e.g., from the header of the object. The speculative locking bit, as previously mentioned, provides an indication of whether an object is speculatively locked.

Once the speculative locking bit is read, a determination is made in step 412 as to whether the bit is set to indicate that the object is speculatively locked. If the speculative locking bit is not set, then the implication is that the object is either owned by a thread, which may be the current thread, or is available for locking. Accordingly, process flow moves from step 412 to step 414 in which the current thread attempts to lock the object using substantially any suitable locking scheme. One suitable locking scheme is described in co-pending provisional U.S. Patent Application No. 60/111, 400, filed Dec. 8, 1998, which is incorporated by reference in its entirety. Another suitable locking scheme is described above with respect to FIG. 1.

If the determination in step 412 is that the speculative locking bit is set to indicate that the object is speculatively locked, a fix-up process is performed in step 416. A fix-up process, which will be described below with reference to FIG. 6, allows the current thread to essentially return the object to an unlocked state. In other words, a fix-up process frees the object from its speculatively locked state, and thereby enables threads to actually lock the object. After the fix-up process is performed, process flow proceeds to step 414 where the current thread attempts to lock the object.

Figure 5:
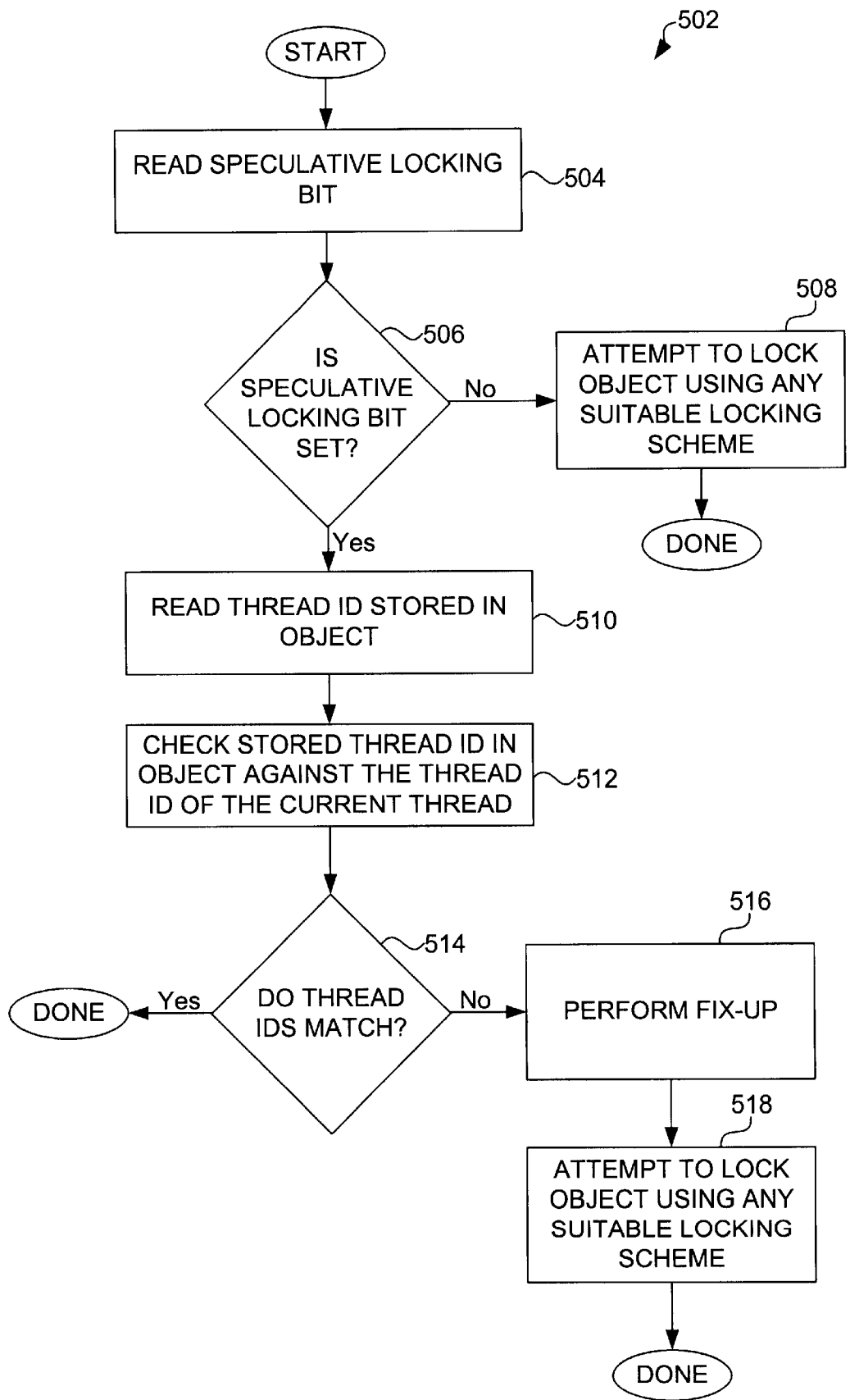
FIG. 5 is a process flow diagram which illustrates a process of locking an object which may or may not be suitable for speculative locking in accordance with an embodiment of the present invention.

In some systems, objects which are members of a speculative locking class may coexist with objects which are not members of a speculative locking class. That is, a system may have a mix of objects which are suitable for speculative locking and objects which are not suitable for speculative locking. FIG. 5 is a process flow diagram which illustrates the steps associated with locking an object that is not necessarily a part of a speculative locking class in accordance with an embodiment of the present invention. A process 502 of locking an object begins at step 504 in which a speculative locking bit or, more specifically, a potential speculative locking bit is read by a current thread. When the object is in a speculative locking class, the bit read identifies whether the object is currently speculatively locked. Alternatively, when the object is not a part of a speculative locking class, then the bit will not be set, e.g., the bit is set to false.

Once the potential speculative locking bit is read in step 504, a determination is made in step 506 as to whether the read bit is set. If the bit is not set, then the indication is that either the object is suitable for speculative locking, but is not currently speculatively locked, or the object is not suitable for speculative locking. As such, process flow moves from step 506 to step 508 in which the current thread attempts to lock the object using substantially any suitable locking scheme, such as the locking scheme described in above-referenced provisional U.S. Patent Application No. 60/111, 400, filed Dec. 8, 1998.

If the determination, however, in step 506 is that the speculative locking bit is set, e.g., set to true, the implication is that the object is suitable for speculative locking and, further, is currently speculatively locked. Hence, process flow moves to step 510 where the stored thread ID is read from the object. The stored thread ID is then checked against the thread ID of the current thread in step 512 to determine if the stored thread ID and the thread ID of the current thread match.

It is determined in step 514 whether the stored thread ID and the thread ID of the current thread match. If it is determined that stored thread ID and the thread ID of the current thread match, the indication is that the current thread has speculatively locked the object. Therefore, in the described embodiment, the current thread is allowed to utilize the object without actually locking the object. As such, the process of locking the object is terminated.

On the other hand, if it is determined in step 514 that the stored thread ID and the thread ID of the current thread do not match, the implication is that the object is currently speculatively locked by another thread, i.e., the thread identified by the stored thread ID. Accordingly, process flow proceeds to step 516 in which a fix-up operation is performed to actually assign current ownership of the object to the thread identified in the stored thread ID if that thread is currently using the object. While the steps involved with a fix-up process may vary widely, one suitable fix-up process is described below with reference to FIG. 6. After the fix-up process is performed, the current thread attempts to lock the object using substantially any suitable locking scheme in step 518, and the process of locking the object is completed.

Figure 6:
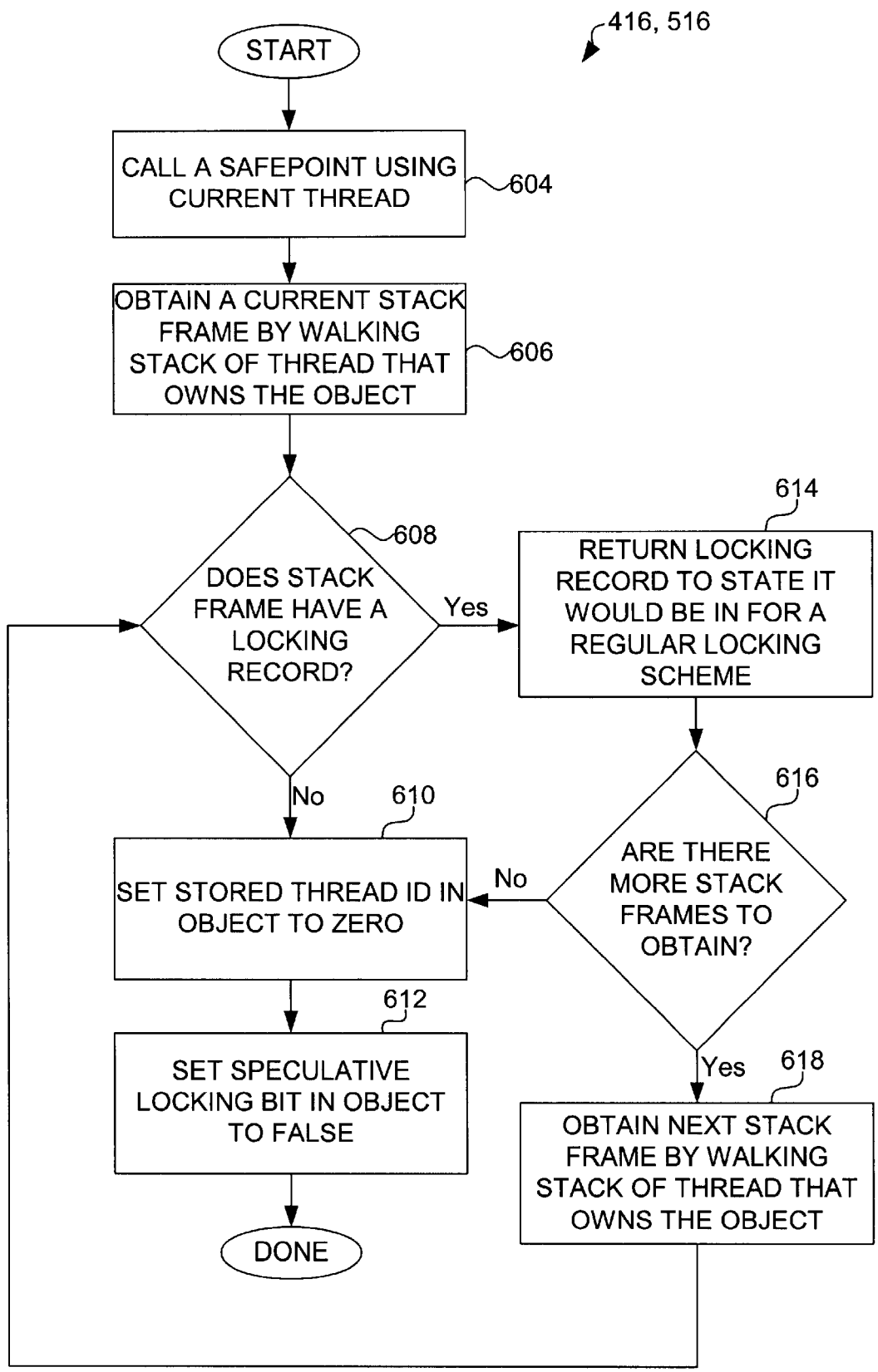
FIG. 6 is a process flow diagram which illustrates a process of performing a fix-up operation, i.e., step 416 of FIG. 4 and step 516 of FIG. 5, to lock an object that is speculatively locked in accordance with an embodiment of the present invention.

Referring next to FIG. 6, the steps associated with a method of performing a fix-up operation will be described in accordance with an embodiment of the present invention. That is, step 416 of FIG. 4 and step 516 of FIG. 5 will be discussed. A fix-up operation is used to actually lock an object which has previously been speculatively locked. A fix-up process begins at step 604 in which a current thread, i.e., the thread attempting to use a speculatively locked object, calls a safepoint. A safepoint, as will be appreciated by those skilled in the art, occurs when substantially every thread in a system is in a safe region or is otherwise halted from operating. A safe region is typically a region of program code through which a thread is processing, and in which pointers are not being manipulated, while an unsafe region is a region of the code through which a thread is processing, and in which pointers may be manipulated. When a thread is in a safe region, then that particular thread causes no problems for the performance of a global operation.

In the described embodiment, the current thread may call a safepoint procedure after it acquires a safepoint lock. The safepoint lock is typically arranged to block other threads from attempting to call a safepoint or to perform a procedure during the safepoint called by the current thread. That is, only the current thread which is in possession of the safepoint lock is allowed to perform any procedure during a safepoint, e.g., a safepoint operation. Prior to calling a safepoint and initiating a safepoint operation, the current thread will wait until all other threads reach a safe region in their own associated code.

Although the current thread calls a safepoint in the described embodiment, the current thread may instead stop the operation of only the thread that owns the object, i.e., that has speculatively locked the object. In other words, rather than halting the operation of substantially all threads and processes, or waiting until substantially all threads and processes are in a safe region of code, the current thread may instead halt only the operation of the thread which has speculatively locked the object.

After the safepoint is called, a thread is able to walk the stack of the thread which has speculatively locked the object in step 606. In the described embodiment, the current thread walks the stack of the thread which has speculatively locked the object, or the "speculative owner" thread. Specifically, the current thread traverses the stack frames of the stack of the speculative owner thread by effectively following the frame pointer of the stack. Once a current stack frame is obtained, then in step 608, a determination is made as to whether the current stack frame has an associated locking record, which may be located on the stack.

If it is determined that the stack frame has a locking record, then process flow proceeds to step 614 where the locking record is returned to a state appropriate to a regular locking scheme. That is, if the speculative owner thread is currently using the object, the locking record is updated to indicate that the speculative owner thread has locked the object, as opposed to speculatively locked the object. In one embodiment, when the speculative owner thread is currently using the object, returning the locking record to an appropriate state may include setting bits in the locking record to indicate that the owner thread effectively holds the lock to the object. Alternatively, if the speculative owner thread is not currently using the object, locking information associated with the object is updated as necessary to indicate that the object is available for locking. Such locking information is generally not included in a locking record, as a locking record will not be located on a stack when the object is not locked.

It should be appreciated that in some systems, the locking record may substantially always be updated to indicate that the speculative owner thread holds the lock to the object, even when the speculative owner thread is not currently operating on the object. In such systems, the speculative owner thread would eventually release the object lock such that the object lock may be acquired by another thread, e.g., the current thread.

Once the locking record is updated, a determination is made in step 616 regarding whether there are more stack frames to obtain. When there are more stack frames to obtain, then the next stack frame in the stack of the owner thread is obtained in step 618. Process flow then returns to step 608 and the determination of whether the current stack frame, e.g., the stack frame obtained in step 618, has an associated locking record. If it is determined in step 608 that the current stack frame does not have an associated locking record, then a determination is made in step 616 as to whether there are additional stack frames to obtain.

When it is determined in step 616 that there are no additional stack frames to obtain, then the indication is that all stack frames have been studied, and, further, that all locking records have effectively been updated. Accordingly, process flow proceeds to step 610 where the stored thread ID in the object is set to zero. As discussed above with respect to FIG. 2, in one embodiment, an object that is suitable for speculative locking includes an extra word for storing the thread ID of the thread which has speculatively locked the object. By setting the stored thread ID to zero, the implication is that the object is not speculatively locked.

After the stored thread ID is set to zero, then the speculative locking bit in the object is "unset," e.g., set to false, to indicate that the object is not speculatively locked in step 612. Once the speculative locking bit is set to false, the fix-up process is completed, and the execution of the owner thread and other processes is allowed to continue once the safepoint is effectively over. It should be appreciated that for an embodiment in which only the execution of the owner thread was halted, the fix-up process may include initiating the execution of the owner thread after the speculative locking bit in the object is set to false.

Figure 7:
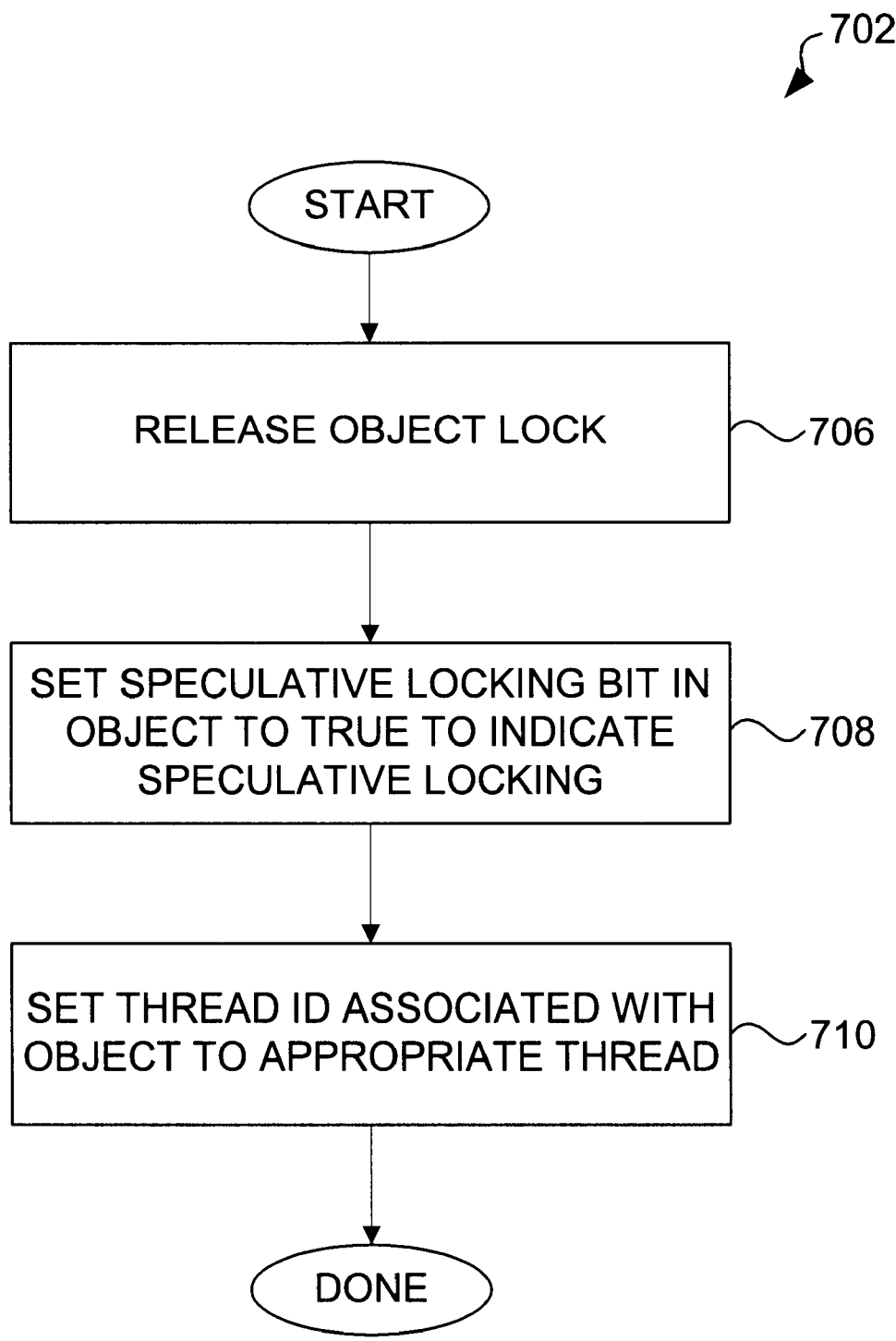
FIG. 7 is a process flow diagram which illustrates a process of speculatively re-locking an object that has previously been locked in accordance with an embodiment of the present invention.

In the described embodiment, an object which is suitable for speculative locking will preferably be speculatively locked when it is not actually locked, i.e., owned, by a thread. That is, an object which is suitable for speculatively locking will substantially always either be owned, speculatively locked, or awaiting speculative locking. Hence, after the object has been owned by a thread, the speculative lock on the object is effectively reinstated. With respect to FIG. 7, a method of reinstating a speculative lock on an object will be discussed in accordance with an embodiment of the present invention. A process 702 of speculatively re-locking an object begins at step 706 in which the actual object lock associated with the object is released. In other words, ownership of the object is relinquished. As will be appreciated by those skilled in the art, substantially any suitable method may be implemented to unlock the object.

Once the object has been unlocked, the speculative locking bit in the object is set, i.e., set to true, in step 708 to indicate that the object is speculatively locked. Then, in step 710, the thread ID associated with the object is set to the identify the appropriate thread, or the thread which effectively holds the speculative lock. It should be appreciated that the appropriate thread may be substantially any thread which may attempt to acquire ownership of the object. By way of example, the appropriate thread may be the current thread, i.e., the thread which has just released the object lock in step 706. Alternatively, the appropriate thread may be the thread which was responsible for initially creating the object. After the thread ID is set, the process of reinstating the speculative lock on the object is completed.

Figure 8:
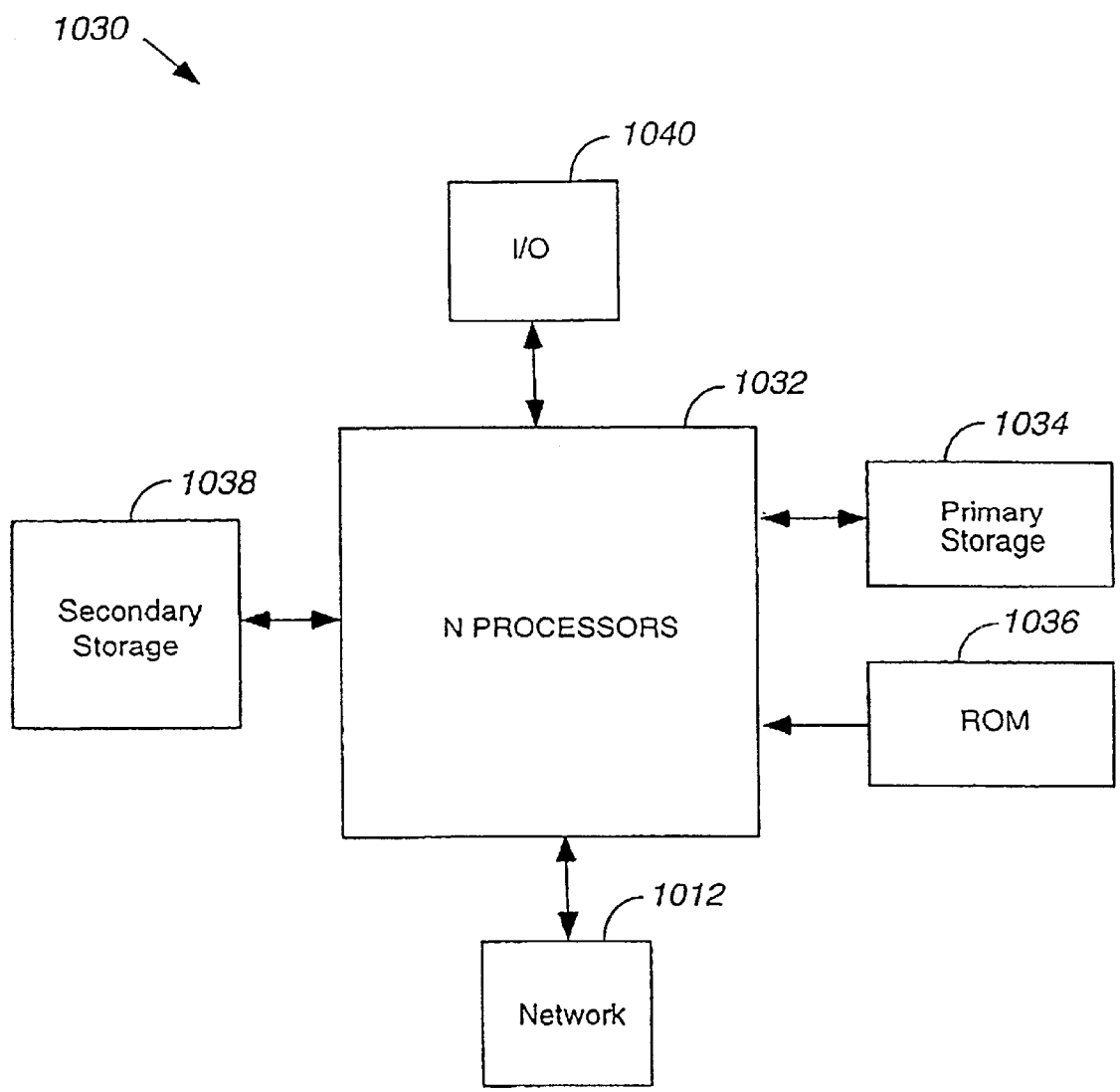
FIG. 8 is a diagrammatic representation of a general purpose computer system suitable for implementing the present invention.

FIG. 8 illustrates a typical, general purpose computer system suitable for implementing the present invention. The computer system 1030 includes any number of processors 1032 (also referred to as central processing units, or CPUs) that are coupled to memory devices including primary storage devices 1034 (typically a random access memory, or RAM) and primary storage devices 1036 (typically a read only memory, or ROM). Computer system 1030 or, more specifically, CPU 1032, may be arranged to support a virtual machine, as will be appreciated by those skilled in the art. One example of a virtual machine that is supported on computer system 1030 will be described below with reference to FIG. 9. As is well known in the art, ROM acts to transfer data and instructions uni-directionally to the CPU 1032, while RAM is used typically to transfer data and instructions in a bidirectional manner. CPU 1032 may generally include any number of processors. Both primary storage devices 1034, 1036 may include any suitable computer-readable media. A secondary storage medium 1038, which is typically a mass memory device, is also coupled bi-directionally to CPU 1032 and provides additional data storage capacity. The mass memory device 1038 is a computer-readable medium that may be used to store programs including computer code, data, and the like. Typically, mass memory device 1038 is a storage medium such as a hard disk or a tape which is generally slower than primary storage devices 1034, 1036. Mass memory storage device 1038 may take the form of a magnetic or paper tape reader or some other well-known device. It will be appreciated that the information retained within the mass memory device 1038, may, in appropriate cases, be incorporated in standard fashion as part of RAM 1036 as virtual memory. A specific primary storage device 1034 such as a CD-ROM may also pass data uni-directionally to the CPU 1032.

CPU 1032 is also coupled to one or more input/output devices 1040 that may include, but are not limited to, devices such as video monitors, track balls, mice, keyboards, microphones, touch-sensitive displays, transducer card readers, magnetic or paper tape readers, tablets, styluses, voice or handwriting recognizers, or other well-known input devices such as, of course, other computers. Finally, CPU 1032 optionally may be coupled to a computer or telecommunications network, e.g., a local area network, an internet network or an intranet network, using a network connection as shown generally at 1012. With such a network connection, it is contemplated that the CPU 1032 might receive information from the network, or might output information to the network in the course of performing the above-described method steps. Such information, which is often represented as a sequence of instructions to be executed using CPU 1032, may be received from and outputted to the network, for example, in the form of a computer data signal embodied in a carrier wave. The above-described devices and materials will be familiar to those of skill in the computer hardware and software arts.

Figure 9:
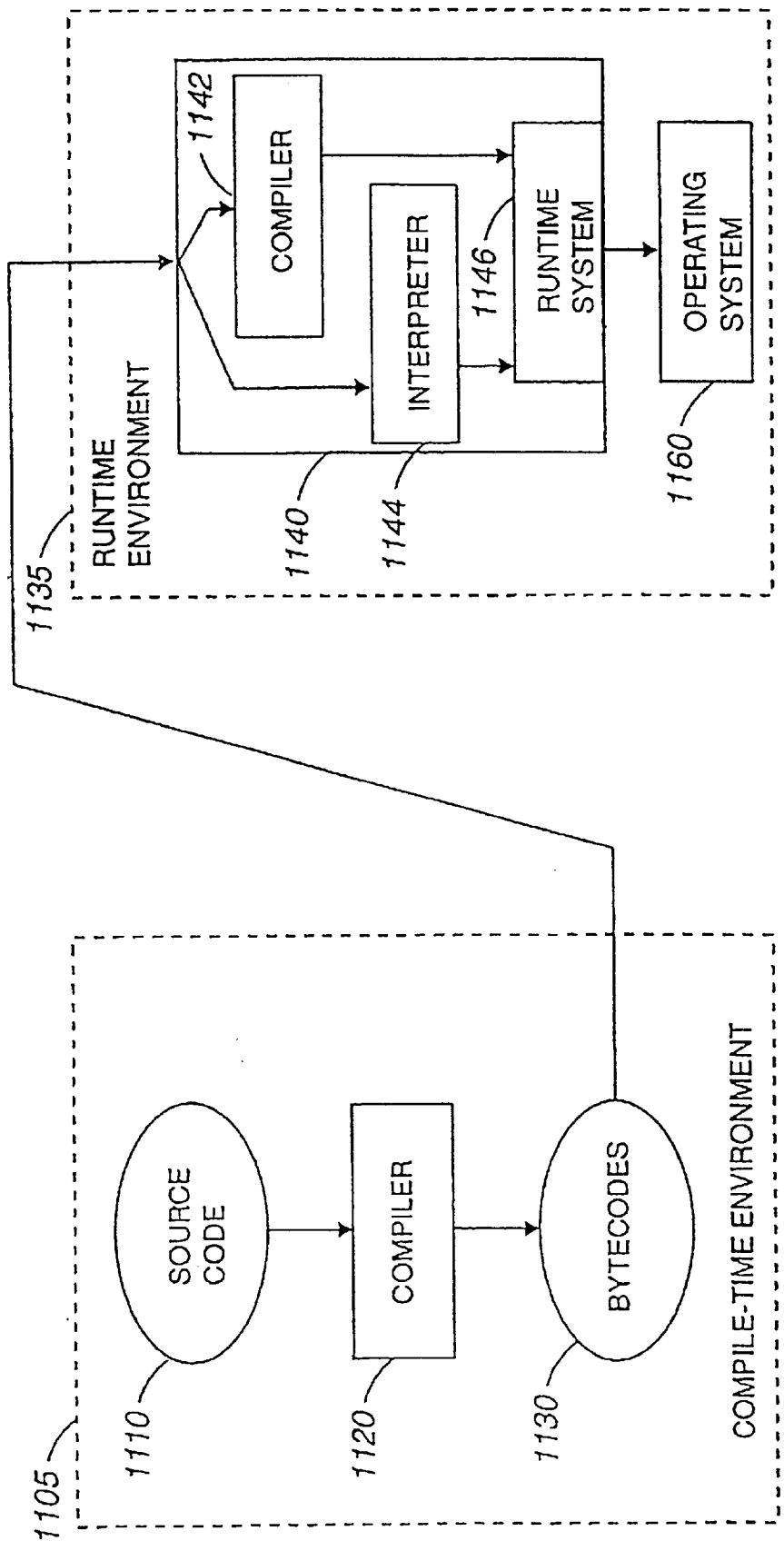
FIG. 9 is a diagrammatic representation of a virtual machine that is supported by the computer system of FIG. 8, and is suitable for implementing the present invention.

As previously mentioned, a virtual machine may execute on computer system 1030. FIG. 9 is a diagrammatic representation of a virtual machine which is supported by computer system 1030 of FIG. 8, and is suitable for implementing the present invention. When a computer program, e.g., a computer program written in the Java™ programming language developed by Sun Microsystems of Palo Alto, Calif., is executed, source code 1110 is provided to a compiler 1120 within a compile-time environment 1105. Compiler 1120 translates source code 1110 into byte codes 1130. In general, source code 1110 is translated into byte codes 1130 at the time source code 1110 is created by a software developer.

Byte codes 1130 may generally be reproduced, downloaded, or otherwise distributed through a network, e.g., network 1012 of FIG. 8, or stored on a storage device such as primary storage 1034 of FIG. 8. In the described embodiment, byte codes 1130 are platform independent. That is, byte codes 1130 may be executed on substantially any computer system that is running a suitable virtual machine 1140. By way of example, in a Java™ environment, byte codes 1130 may be executed on a computer system that is running a Java™ virtual machine.

Byte codes 1130 are provided to a runtime environment 1135 which includes virtual machine 1140. Runtime environment 1135 may generally be executed using a processor such as CPU 1032 of FIG. 8. Virtual machine 1140 includes a compiler 1142, an interpreter 1144, and a runtime system 1146. Byte codes 1130 may generally be provided either to compiler 1142 or interpreter 1144.

When byte codes 1130 are provided to compiler 1142, methods contained in byte codes 1130 are compiled into machine instructions, as described above. On the other hand, when byte codes 1130 are provided to interpreter 1144, byte codes 1130 are read into interpreter 1144 one byte code at a time. Interpreter 1144 then performs the operation defined by each byte code as each byte code is read into interpreter 1144. In general, interpreter 1144 processes byte codes 1130 and performs operations associated with byte codes 1130 substantially continuously.

When a method is called from an operating system 1160, if it is determined that the method is to be invoked as an interpreted method, runtime system 1146 may obtain the method from interpreter 1144. If, on the other hand, it is determined that the method is to be invoked as a compiled method, runtime system 1146 activates compiler 1142. Compiler 1142 then generates machine instructions from byte codes 1130, and executes the machine-language instructions. In general, the machine-language instructions are discarded when virtual machine 1140 terminates. The operation of virtual machines or, more particularly, Java™ virtual machines, is described in more detail in The Java™ Virtual Machine Specification by Tim Lindholm and Frank Yellin (ISBN 0-201-63452-X), which is incorporated herein by reference in its entirety.

Although only a few embodiments of the present invention have been described, it should be understood that the present invention may be embodied in many other specific forms without departing from the spirit or the scope of the invention. By way of example, steps associated with speculatively locking an object may be reordered, removed or added depending upon the requirements of a particular system.

The steps associated with a fix-up process may also vary depending upon the requirements of a particular system. For instance, in some systems, there is a mapping between a safepoint and the locking records. The mapping identifies where on a stack the locking records are effectively located. Such systems enable the mapping to either be performed statically by a compiler, or dynamically by an interpreter. It should be appreciated that when such a mapping exists, it may not be necessary to explicitly determine whether each stack frame in a stack has an associated locking record. In other words, the step of determining whether a stack frame has a locking record may be eliminated from the fix-up process.

It should be understood that when a current thread attempts to lock a speculatively locked object, the speculatively locked object may be in the process of being used by the thread identified in the stored thread ID of the object. In one embodiment, if this is the case, in lieu of calling a safepoint as described above, the current thread may delay its attempt to lock the object until the thread identified in the stored thread ID has completed its use of the object. Alternatively, if the current thread has priority over the thread identified in the stored thread ID, the current thread may stop the execution of only the thread identified in the stored thread ID, and initiate a fix-up process.

In one embodiment, as described above, an object may be speculatively locked, e.g., re-locked, once a thread which has actually obtained the lock for an object has released the lock. When a thread is speculatively locked again after having been actually locked, the speculative lock may generally either be held by the thread which just released the lock, or by the thread which originally created the object. Alternatively, diagnostic data may be used to determine another thread which would be suitable for speculatively locking the object. For example, the thread which has most often had ownership of the object over a given period of time may be determined to be, in effect, the most appropriate thread for speculatively locking the object.

The present invention has generally been described in terms of speculatively locking an object using one thread, then allowing a second thread to actually lock the object when the second thread requests ownership of the object. It should be understood, however, that rather than actually locking the object, the second thread may instead obtain the speculative lock on the object without departing from the spirit or the scope of the present invention. For example, allowing the second thread to speculatively lock the object rather than obtain the actual lock on the object may be preferable in the event that there is a period of time during which the only thread that attempts to use the object is the second thread. For such an embodiment, the stored thread ID in the object may be updated to reference the second thread when the second thread requests access to the object, and the first thread is not currently using the object.

The process of reinstating a speculative lock on an object may generally occur during a computational idle period, e.g., during a safepoint. Alternatively, the process of reinstating a speculative lock may occur using a combination of atomic operations. In one embodiment, the actual lock associated with an object may be released prior to reinstating a speculative lock. Specifically, in such an embodiment, the release of the actual lock may not be a part of the process of reinstating a speculative lock but may, instead, occur separately. When relinquishing the ownership of an object is not a part of the process of reinstating a speculative lock, the reinstatement of a speculative lock may occur at any time after ownership of the object is relinquished. For instance, the reinstatement may be delayed until an idle processing period has been reached.

A process of speculatively locking an object may occur atomically, e.g., may involve atomic operations, as mentioned above. In one embodiment, in order to avoid the implementation of atomic operations in determining whether an object is speculatively locked, an object may be arranged such that it is substantially only possible for the object to go from a speculatively locked state to an actual locked state. Allowing a speculative lock on an object to be claimed basically only at object creation and at safepoints enables the object to go only from a speculatively locked state to an actual locked state. By substantially only allowing the object to go from being speculatively locked to being actually locked, issues associated with two threads attempting to claim "speculative ownership" of an object, i.e., to speculatively lock an object, may be avoided.

It should be appreciated that in some embodiments, an object may only be speculatively locked when it is created. That is, once an object is actually locked by a thread, the object may be prevented from being speculatively locked again by any thread without departing from the spirit or the scope of the present invention.

Further, while acquiring the actual ownership of an object has been described in terms of obtaining an object lock, the actual ownership of an object may be acquired in substantially any suitable manner. By way of example, the actual ownership of an object may be obtained through the use of mutexes, monitors, or semaphores.

While the present invention has generally been described in terms of speculatively locking objects, it should be appreciated that the methods associated with speculatively locking objects may also be applied to the speculative locking of data structures, such as vectors or hash tables, e.g., data structures that are instances of locked synchronized classes. Therefore, the present examples are to be considered as illustrative and not restrictive, and the invention is not to be limited to the details given herein, but may be modified within the scope of the appended claims.

What is claimed is:

1. A computer-implemented method for acquiring use of an object using a current thread, the computer-implemented method comprising:

determining when a first bit associated with the object is set to indicate that the object is associated with a speculative owner thread, the speculative owner thread having use of the object, wherein the object is not locked by the speculative owner thread;

checking a stored identifier, the stored identifier being associated with the object, the stored identifier being arranged to identify the speculative owner thread;

determining whether the stored identifier identifies the current thread, wherein when the stored identifier identifies the current thread, the current thread already has use of the object; and locking the object with respect to the speculative owner thread when it is determined that the stored identifier does not identify the current thread.

2. A computer-implemented method as recited in claim 1 wherein the stored identifier is checked when it is determined that the first bit is set to indicate that the object is associated with the speculative owner thread.

3. A computer-implemented method as recited in claim 1 wherein the stored identifier is checked before determining when the first bit associated with the object is set to indicate that the object is associated with the speculative owner thread.

4. A computer-implemented method as recited in claim 1 further including attempting to lock the object with respect to the current thread after the object is locked with respect to the speculative owner thread.

5. A computer-implemented method as recited in claim 1 wherein locking the object with respect to the speculative owner thread is performed during a safepoint.

6. A computer-implemented method as recited in claim 5 wherein the safepoint is called using the current thread.

7. A computer-implemented method as recited in claim 5 wherein locking the object with respect to the speculative owner thread when it is determined that the stored identifier does not identify the current thread includes:

identifying at least one stack frame that has an associated locking record, the stack frame being included in a stack associated with the speculative owner thread; and modifying the associated locking record to identify the object as being locked by the speculative owner thread.

8. A computer-implemented method as recited in claim 7 wherein locking the object with respect to the speculative owner thread further includes:

refreshing the stored identifier; and refreshing the first bit.

9. A computer-implemented method as recited in claim 8 wherein refreshing the stored identifier includes setting the stored identifier to not identify the speculative owner thread, and refreshing the first bit includes setting the first bit to indicate that the speculative owner thread has locked the object.

10. A computer-implemented method as recited in claim 8 refreshing the first bit includes setting the first bit to indicate that the speculative owner thread either has locked the object or does not have use of the object.

11. A computer-implemented method as recited in claim 5 wherein locking the object with respect to the speculative owner thread includes:

identifying multiple stack frames that each have an associated locking record, the multiple stack frames being included in a stack associated with the speculative owner thread; and modifying the associated locking record for each stack frame of the multiple stack frames to identify the object as being locked by the speculative owner thread.

12. A computer-implemented method as recited in claim 1 wherein the object is locked with respect to the speculative owner thread when it is determined that the stored identifier does not identify the first thread and when the speculative owner thread is currently operating on the object.

13. A computer-implemented method for acquiring ownership of an object in a threaded system, the computer-implemented method comprising:

assigning non-locked ownership of the object to a first thread, wherein assigning non-locked ownership of the object to the first thread enables the first thread to operate on the object without possessing an ownership lock associated with the object; and attempting to obtain the ownership lock associated with the object using a second thread, wherein attempting to obtain the ownership lock associated with the object using the second thread includes causing the first thread to acquire possession of the ownership lock.

14. A computer-implemented method as recited in claim 13 wherein assigning non-locked ownership of the object to the first thread includes setting non-locked ownership bits in the object to associate the object with the first thread, the nonlocked ownership bits being separate from bits associated with the ownership lock.

15. A computer-implemented method as recited in claim 14 further including:

attempting to operate on the object using the first thread; and determining whether the non-locked ownership bits in the object substantially identify the first thread, wherein when the non-locked ownership bits in the object substantially identify the first thread, the first thread is allowed to operate on the object without possessing the ownership lock.

16. An object-based computing system which includes a speculative owner thread and an object, the speculative owner thread having an associated stack, the objectbased computing system comprising:

a processor;

a first determinator coupled to the processor, the first determinator being arranged to determine when a first bit associated with the object is set to indicate that the object is associated with the speculative owner thread, the speculative owner thread having use of the object, wherein the object is not locked by the speculative owner thread;

a checking mechanism coupled to the processor, the checking mechanism being arranged to check a stored identifier, the stored identifier being associated with the object, the stored identifier being arranged to identify the speculative owner thread;

a second determinator coupled to the processor, the second determinator being arranged to determine whether the stored identifier identifies the current thread, wherein when the stored identifier identifies the current thread, the current thread already has use of the object; and a locking mechanism coupled to the processor, the locking mechanism being arranged to lock the object with respect to the speculative owner thread when it is determined that the stored identifier does not identify the first thread.

17. An object-based computing system as recited in claim 16 wherein the stored identifier is checked when it is determined that the first bit is set to indicate that the object is associated with the speculative owner thread.

18. An object-based computing system as recited in claim 16 wherein the locking mechanism is further arranged to facilitate a call to a safepoint during which the object is locked with respect to the speculative owner thread.

19. An object-based computing system as recited in claim 16 further including:

an identifier mechanism arranged to identify at least one stack frame that has an associated locking record, the stack frame being included in the stack associated with the speculative owner thread; and a record modifier arranged to modify the associated locking record to identify the object as being locked by the speculative owner thread.

20. A computer program product for acquiring use of an object using a current thread, the computer program product comprising:

computer code for determining when a first bit associated with the object is set to indicate that the object is associated with a speculative owner thread, the speculative owner thread having use of the object, wherein the object is not locked by the speculative owner thread;

computer code for checking a stored identifier, the stored identifier being associated with the object, the stored identifier being arranged to identify the speculative owner thread;

computer code for determining whether the stored identifier identifies the current thread, wherein when the stored identifier identifies the current thread, the current thread already has use of the object;

computer code for locking the object with respect to the speculative owner thread when it is determined that the stored identifier does not identify the first thread; and a computer-readable medium that stores the computer codes.

21. A computer program product as recited in claim 20 wherein the computerreadable medium is one selected from the group consisting of a data signal embodied in a carrier wave, a floppy disk, a hard drive, a CD-ROM, and a tape.

22. A computer program product as recited in claim 20 further including computer code for attempting to lock the object with respect to the current thread after the object is locked with respect to the speculative owner thread.

23. A computer program product as recited in claim 20 wherein the computer code for locking the object with respect to the speculative owner thread includes computer code that for locking the object during a safepoint.

24. A computer program product as recited in claim 23 further including computer code for calling the safepoint using the current thread.

25. A threaded computer system comprising:

a processor;

a first thread;

an assigner for assigning non-locked ownership of an object to the first thread, wherein assigning non-locked ownership of the object to the first thread enables the first thread to operate on the object without possessing an ownership lock associated with the object; and a second thread, the second thread being arranged to attempt to obtain the ownership lock associated with the object, wherein when the second thread attempts to obtain the ownership lock associated with the object, the first thread is caused to acquire possession of the ownership lock.

26. A threaded computer system as recited in claim 25 wherein the assigner is arranged to set non-locked ownership bits in the object to associate the object with the first thread, the non-locked ownership bits being separate from bits associated with the ownership lock.

27. A threaded computer system as recited in claim 26 further including a determinator, wherein when the first thread attempts to operate on the object, the determinator determines whether the non-locked ownership bits in the object substantially identify the first thread, wherein when the non-locked ownership bits in the object substantially identify the first thread, the first thread is allowed to operate on the object without possessing the ownership lock.

28. A computer program product allowing ownership of an object in a threaded system to be acquired, the computer program product comprising:

computer code for assigning non-locked ownership of the object to a first thread, wherein assigning non-locked ownership of the object to the first thread enables the first thread to operate on the object without possessing an ownership lock associated with the object;

computer code for attempting to obtain the ownership lock associated with the object using a second thread, wherein the computer code for attempting to obtain the ownership lock associated with the object using the second thread includes computer code for causing the first thread to acquire possession of the ownership lock.

* * * * *